United States Patent [19]

Vandenberg et al.

[11] 4,419,961
[45] Dec. 13, 1983

[54] MILKING PARLOR CONSTRUCTION

[76] Inventors: August Vandenberg; Ben W. Vandenberg, both of 17226 Roseton Ave., Artesia, Calif. 90701; Andrew W. Vandenberg, 15751 Ryon St.; Ben E. Haws, 8828 Laurel St., both of Bellflower, Calif. 90706

[21] Appl. No.: 369,030

[22] Filed: Apr. 16, 1982

[51] Int. Cl.³ ............................................. A01K 1/12
[52] U.S. Cl. ................................... 119/14.03; 119/27
[58] Field of Search ............ 119/14.03, 51.11, 52 AF, 119/56 R, 27

[56] References Cited

U.S. PATENT DOCUMENTS

3,537,624 11/1970 Hartman ...................... 119/56 R X
4,194,467 3/1980 Nielsen et al. .................. 119/14.03
4,256,054 3/1981 Hitchcock ....................... 119/51.11
4,362,127 12/1982 Nielsen et al. .................. 119/14.03

Primary Examiner—Hugh R. Chamblee
Attorney, Agent, or Firm—Cislo, O'Reilly & Thomas

[57] ABSTRACT

An improved milking parlor construction comprising the combination of a modular unit which comprises a module which may be utilized in fabricating milking parlors of the type wherein a central milking pit area has juxtapositioned on either side a cattle stand wherein each of the modules is composed of a vertical upright member that may be supported in concrete or the like and from which a feed bowl and shroud and individual cattle feeding station gate may be hung. Superpositioned over the vertical upright, which is of hollow construction, is a feed conveyor having communication to the vertical upright member which has a feed chute terminating in the feed bowl by which feed may be fed to the feed bowl of each of the cattle stations. Means are utilized whereby one or plurality of the gates defining a captive station at which the cattle are milked and, incidentally fed, provides easy egress for the cattle to the exit corridor to leave the milking parlor structure. Adequate cross-ties and vertical support members completes the salient components of the improved milking parlor construction. In other embodiments uniquely configured components make up the overall construction which has the ability to meet a myriad of individual needs depending upon number of cattle involved.

15 Claims, 13 Drawing Figures

MILKING PARLOR CONSTRUCTION

BACKGROUND OF THE INVENTION

This invention pertains to milking parlor structures and more particularly to improved milking parlor construction over that conventionally found in the prior art. The prior art is well aware of milking barn constructions or parlors of the modern type wherein a milking pit is sandwiched between juxtapositioned cattle stands wherein cattle are allowed to enter the milking parlor structure to be milked and to incidentally be fed. The feeding acts as an enticement to attract the individual dairy cattle to the individual stations at which milking of the cow may take place.

In the prior art structures, such as Vandenberg U.S. Pat. No. 3,885,528, a U.S. patent directed to RAPID EXIT MILKING BARN, there was disclosed in general a conventional milking parlor construction which has suffered from several deficiencies.

Firstly, in most milking parlor constructions there is an inability to provide a modular unit that may be indexed to accommodate the individual dairy farmer on an individual basis. That is, the structures are normally such that the individual dairyman cannot be selective as to the number of milking stations he wishes to employ in one or more of the milking parlor structures. The prior art structures are also deficient in requiring sophisticated, uniquely and specifically configured support structure for making up the parlor construction in order to accommodate existing conditions and/or situations.

Additionally, prior art structures having an automatic feed system have suffered in that the feeding mechanism has generally, due to wear and tear caused by the cattle entering and leaving the individual stations, become misaligned so that almost continual maintenance in order to keep the mechanisms operative is necessary. Additionally, the prior art structures have required supporting structure which has created cumbersome egress and entrance corridors, not to mention the increased cost of installation.

With the herein disclosed improved milking parlor construction, there is disclosed a basic unit or module that comprises a central, hollow vertical member from which the feed bowl and accompanying shroud and individual exit gates forming the individual milking stations may be hung, wherein the vertical member is securely supported in concrete or, alternatively, supported through a plate and bolt mechanism which in turn is tied to the concrete floor making up the milking parlor structure.

Additionally, the vertical upright member is of hollow construction and has superpositioned thereover a feed conveyor and the like which feeds fodder to the individual uprights which have communication to the feed bowls by which fodder may be fed thereto. Since the vertical uprights are of strudy steel construction and have appropriately spaced tie-in support structure, a rigid end-structure results which is not easily misaligned due to the passage of cattle through the structure.

Additionally, the individual gates making up the milking parlor construction may be remotely operated, on an individual or pluralistic manner so that one or more of the cattle may exit either simultaneously or serially to the exit corridors adjacent the individual cattle stations.

Also disclosed are unique mechanisms for delivering metered amounts of feed to the individual feed bowls making up each of the milking stations of the structure. Because of the modular aspect of the structure, a selected number of milking stations may be designed to fit into existing structures without the need to resort to the design of specialty mechanisms thereby decreasing the attendant manufacturing and construction costs involved in milking parlor barns.

OBJECTS AND SUMMARY OF THE INVENTION

It is an object of the invention to provide an improved milking parlor construction.

It is another object of the invention to provide an improved milking parlor construction wherein the same is made up of a modular unit wherein each unit comprises a hollow vertical upright member from which a feed bowl and gate member may be mounted.

It is another even further important object of the invention to provide a milking parlor construction having a basic modular unit involving a hollow vertical upright which is secured in concrete or the like and wherein a feed conveyor is superpositioned over the hollow upright and is adapted to feed fodder therethrough.

It is another even further more specific important object of the invention to provide an improved milking parlor construction comprising a central milk pit area and having adjacent cattle or milking stations formed by individual upright members of hollow configuration and having secured thereto a feed bowl and pivotally mounted gate member which gate member may be individually or plurally placed in either the open or closed positions.

It is another even further more specific important object of the invention to provide an improved milking parlor construction wherein a hollow vertical member forms both the feed chute and supporting member from which a feed bowl and pivotally mounted gate may be hung.

It is another even further more specific important object of the invention to provide an improved milking parlor construction comprised of modular units wherein each of said modular units employs a hollow vertical upright member which is adapted for securement in a base or the like, and wherein a feed conveyor communicates to the hollow upright which in turn communicates to the feed bowl and through which feed may be delivered.

It is another even further more specific and important object of the invention to provide an improved milking parlor construction made up of a modular unit wherein each modular unit has a hollow vertical upright member from which is hung in securement a feed bowl member and a pivotally mounted gate member for movement into the open and closed positions and wherein one or a plurality of the gate members may be remotely controlled to be positioned in either the open or closed positions.

It is another even further more specific and important object of the invention to provide an improved milking parlor construction wherein the modular unit making up the construction is constructed such that there is an integralness between feed chute and feed bowl so that the misalignment problems with respect to feeding are all but nonexistent.

It is another even further even more specific important object of the invention to provide an improved milking parlor construction having a modular basic unit which basic unit employs a vertical hollow member in communication with a superpositioned feed conveyor or the like and wherein through the hollow member, fodder may be fed to a feed bowl supported on said hollow member.

It is an even further and more important and specific object of the invention to provide an improved milking parlor construction having a central pit area with adjacent cattle stands in juxtaposition thereto, wherein the cattle stands are formed by a plurality of hollow vertical upright members and each securely supporting a feed bowl member and a pivotally mounted gate member which gate members may be individually operated or operated in the plurality at one time to either the open or closed positions.

It is another even further even more specific and important object of the invention to provide an improved milking parlor construction wherein modular units comprising vertical member uprights are utilized to form the main fodder communication between a superpositioned feed conveyor and a feed bowl supported on the vertical upright and wherein selected and metered amounts of fodder may be delivered to said feed bowl.

It is another even further more specific and important object of the invention to provide a milking parlor construction comprising a central pit milking area with adjacently positioned milking stands wherein each of the milking stands are formed by plurality of modular units wherein each of the units employs a vertical hollow upright member securely supported from a base and wherein the salient components of a feed bowl and exit gate are supported therefrom.

Basically, in an exemplary embodiment, the invention is directed to a milking parlor construction comprising the combination of a module comprising a hollow vertical upright member adapted for securement in a base or the like. A feed bowl means is secured to said hollow vertical upright member and defines a cattle feed station. A gate member is pivotally mounted on said hollow vertical upright member and is adapted to move between an open position and a closed position. A feed conveyor means is superpositioned to said hollow vertical upright member and is adapted to deliver feed to said hollow vertical upright member defining a feed passageway having communication to said feed bowl means. Means to move said gate member into a selected one of the open and closed positions completes the salient components of the modular unit.

Milking parlor barns may use a plurality of these modular units in conjunction with a central milking pit and juxtapositioned milking stands so that feeding and milking of individual cattle on an individual or pluralistic basis is possible.

These and further objects of the invention will become more apparent from the hereinafter following commentary taken in conjunction with the drawings.

DESCRIPTION OF THE BEST EMBODIMENTS CONTEMPLATED

Figure 1:
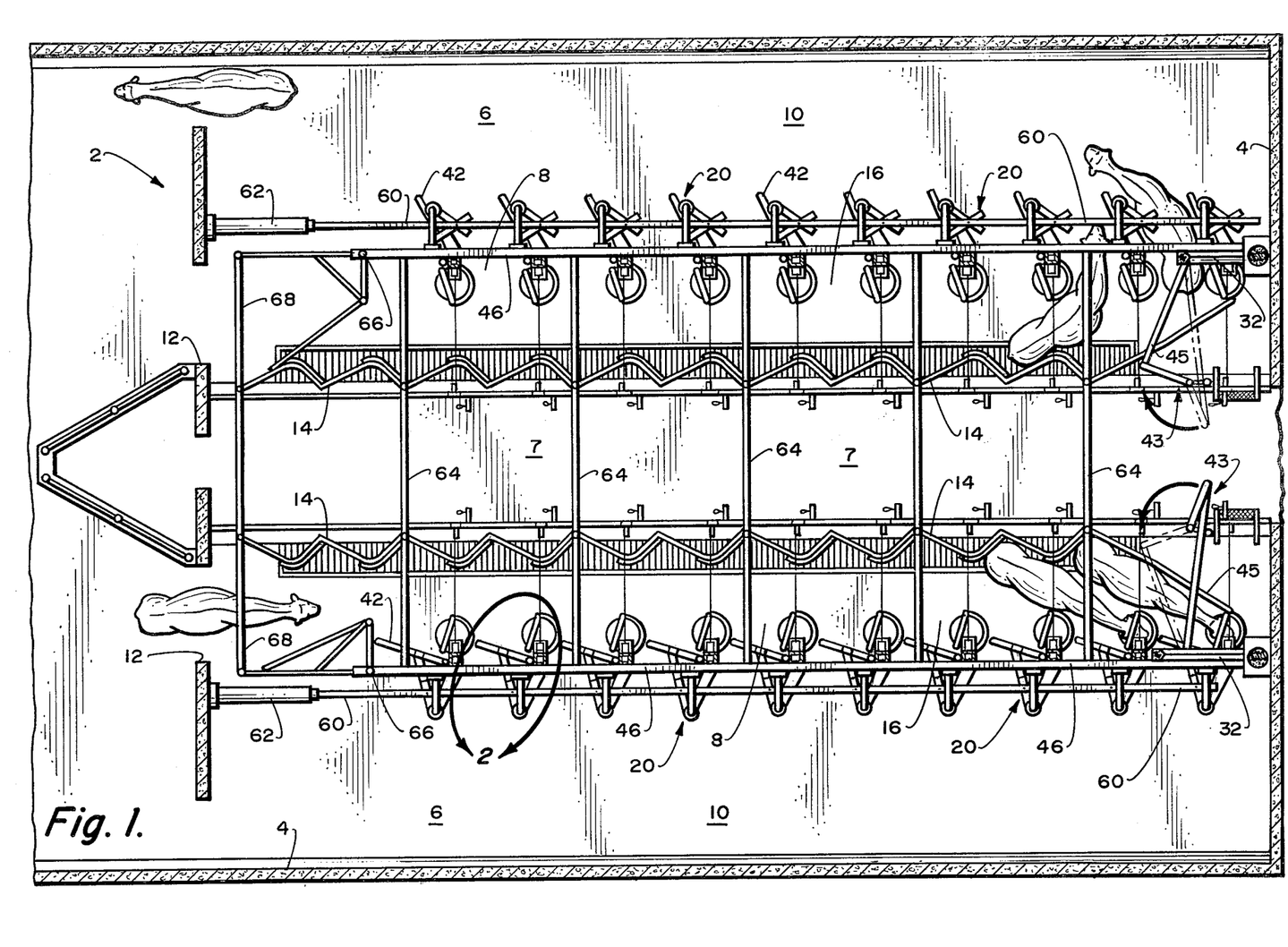
FIG. 1 is a plan view illustrating the improved milking parlor construction of the invention with regard to conventional parlor barns.

Referring to the drawings, wherein like numerals of reference designate like elements throughout, it will be seen that a typical milking barn 2 is illustrated having exterior walls 4 with concrete floor 6 or the like and having a central milking pit 7 of rectangular configuration with juxtapositioned cattle stands 8 and exit corridors 10 leading to the outside of the structure 2.

The structure 2 is also provided with egress-entry doors 12 by which cattle may enter from a holding pen or wash facility not shown to the milking stands 8 as is known in the art.

Convolute splash shields 14 are also provided as is conventional so as to form a backstop for the individual cattle receiving stations 16 as best seen in FIG. 1.

Each of the cattle receiving stations 16 are formed in the cattle stands 8 in typical fashion and in conformity with the herein disclosed invention, a modular unit 20 forms the basic structure or member forming each of the individual milking or feeding stations 16 in cooperation with splash shield 14.

The individual module 20 is fabricated of a hollow vertical upright member 22 in this particular instance of heavy gauge steel of U-shaped configuration and terminating in a terminus 24 which is secured by welding or bolting to a pipe 26 welded to a baseplate 28 and being anchored to bolts 30 embedded in concrete 6.

The hollow member 22 is of 12-gauge steel and is of 6" square tubular construction and may be provided with a see-through window at the top as will become apparent for reasons to be described. The vertical member 22 has superpositioned thereover a conveyor member 32 in this particular instance having auger 34 to feed fodder and the like from supply hoppers not shown to the individual hollow vertical members 22 as will become more apparent as the description proceeds herein.

Hung from member 22 is feed bowl 36 and encircling shroud 38 having entry pipe member 40 defining support structure to support the shroud 38 and to offer barrier protection against an individual cow damaging vertical member 22.

Suspended from vertical member 22 in pivotally supported fashion is gate member 42 fabricated of steel hollow pipe, welded or otherwise secured, to form a barrier gate at each of the individual cattle stations 16. Supported from each of the vertical members 22 are support structure 44 secured to axial box beam 46 which runs the extent of the milking parlor barn and which is bolted or otherwise secured to the individual support members 44, the terminus of which is secured to lateral member 48 bolted, welded or otherwise secured to vertical member 22 and having positioned gate opening and closing mechanism 50. In this particular instance the gate actuation mechanism 50 is of scissor-like configuration wherein the member 52 being secured to the upright 54 welded to gate member 42 is connected in pivotal fashion to second lateral member 54 forming the other component of the scissor assembly 50. The lateral member 52 carries an abutment 56 on the terminus 58 thereof for purposes that will become apparent. An elongate draw-bar member 60 is secured to each of the members 52 and 54 through the pivot 62 so that axial movement of the draw-bar 60 in the direction and reverse direction of the arrows shown in FIG. 3 will open or close the individual gate members 42 making up each of the milking stations 16. The draw-bar 60 may be manually actuated or, in this particular instance, may be actuated by means of air cylinders 62 in order to open or close the individual gates 42.

However, in order to open the individual gates 42 in singular fashion one may individually install manual opening means 43 onto each of the gates 42 so that each gate 42 may be individually opened through opening lever mechanism 45 (only two such mechanisms being shown, FIG. 1, for purposes of illustration). Thus, the individual gates may be opened in tandem or all at one time or individually, if so desired.

At the spaced and appropriate places crosstie members 64 are utilized in order to rigidify the improved parlor construction of the invention. Also, appropriate and vertical members, such as 66, may be utilized where appropriate and needed, as for example, where entrance gates 68 are positioned at the entrances to the milking stands 8.

Figure 2:
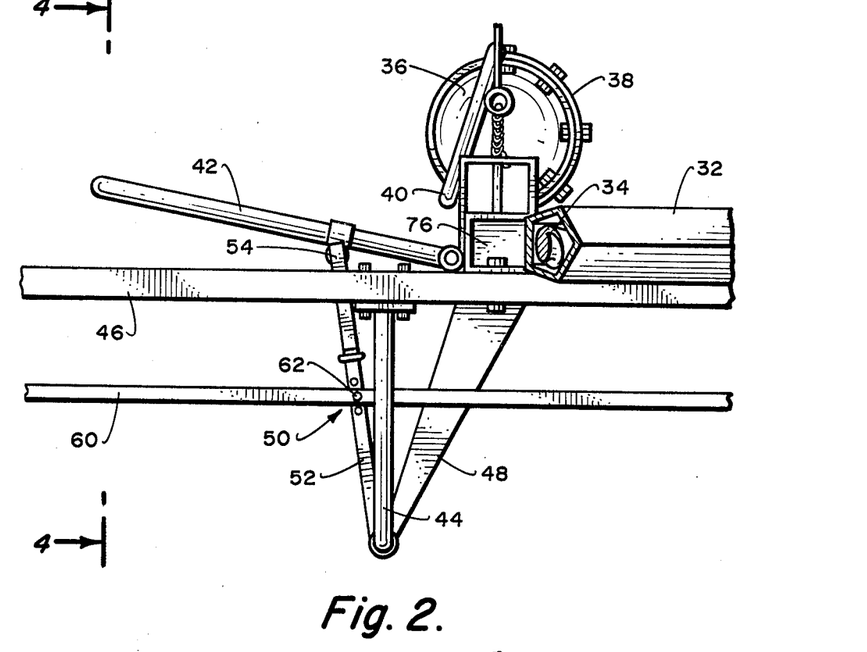
FIG. 2 is a view taken along the line 2—2 of FIG. 1.
Figure 3:
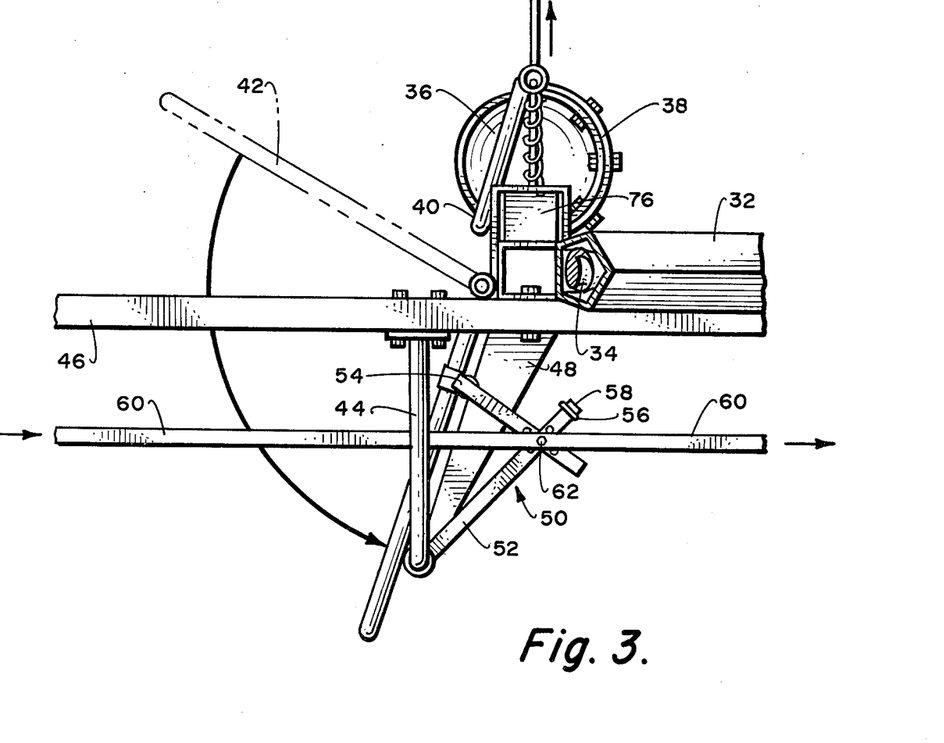
FIG. 3 is a view similar to FIG. 2 but illustrating the gate in the open position and showing the feeding chute to the individual feed passageway in the open position.
Figure 4:
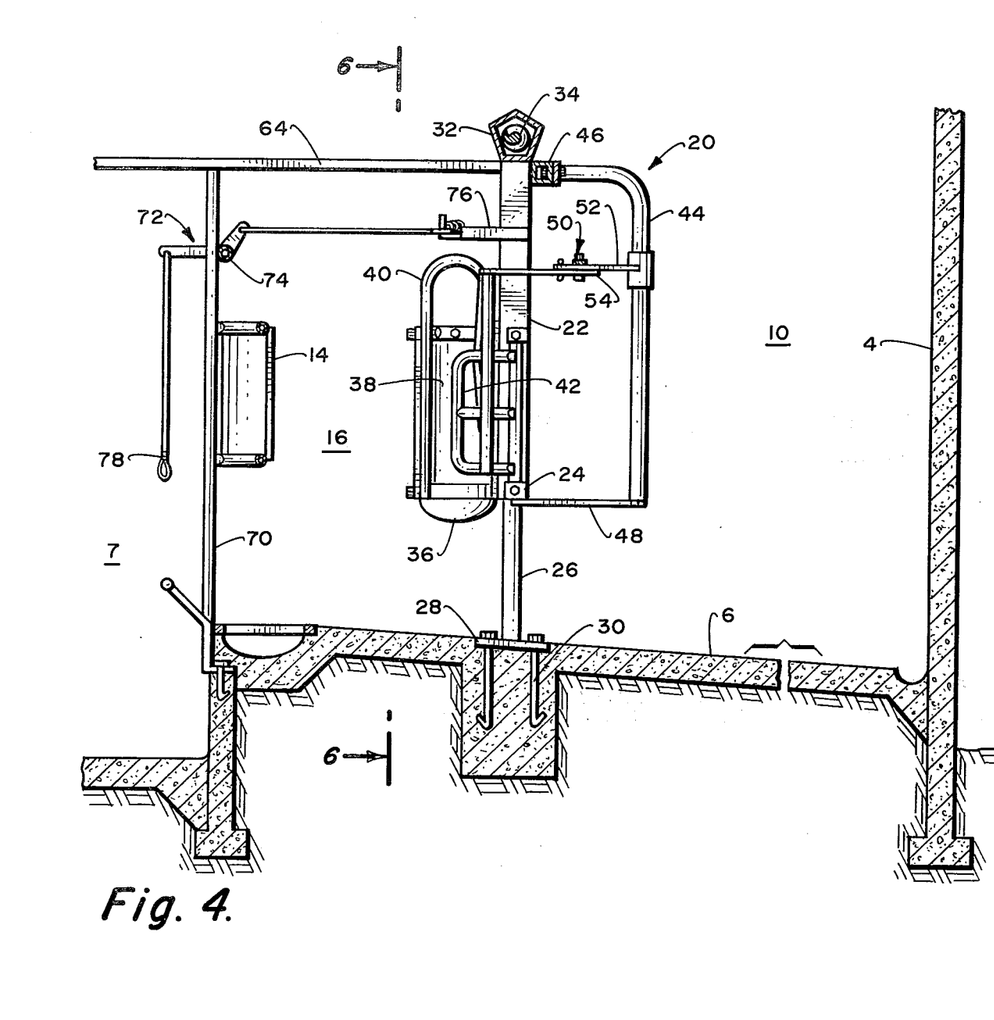
FIG. 4 is a view taken along the line 4—4 of FIG. 2.
Figure 5:
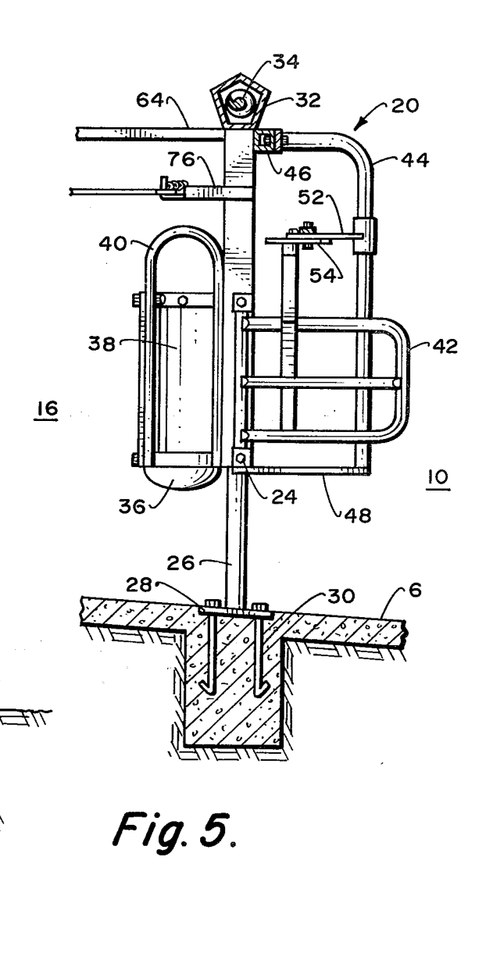
FIG. 5 is a view similar to FIG. 4 but showing the pivotally mounted gate in the open position.
Figure 6:
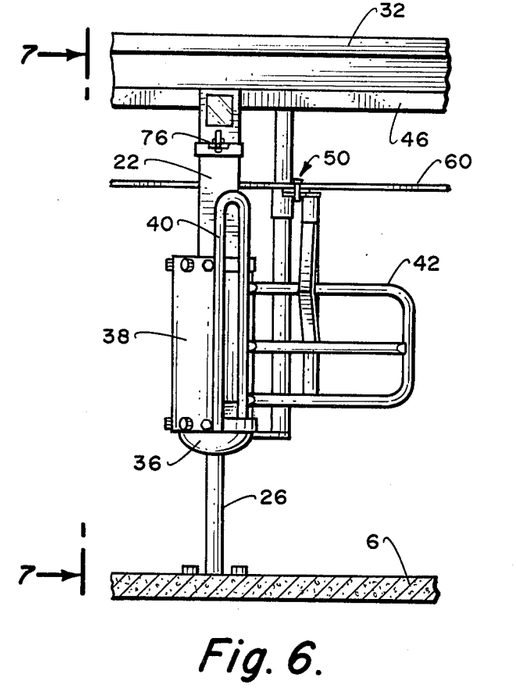
FIG. 6 is a view taken along the line 6—6 of FIG. 4.
Figure 7:
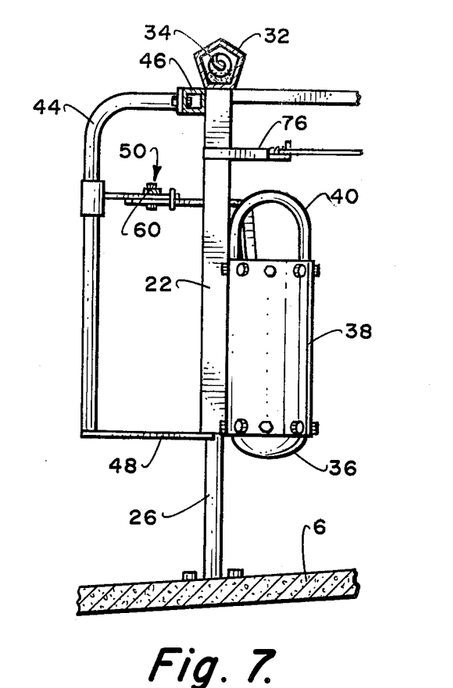
FIG. 7 is a view similar to FIG. 6 but illustrating the pivotally mounted gate in the closed position.

Referring now to FIGS. 2, 3, and 4, it will be seen that an appropriate vertical member 70 is provided to accommodate manual mechanism 72 in this instance comprising a lever 74 connected to horizontally mounted chute member 76 which is put in the open position by pulling on the hand cord 78 and which open position is illustrated in FIG. 3. It will be noted that there is provided at the approximate terminus 80 of hollow upright member 22 an aperture 82 opening into the feed bowl 36 and an inclined or baffle plate 84 is provided so as to facilitate the flow of fodder.

Figure 8:
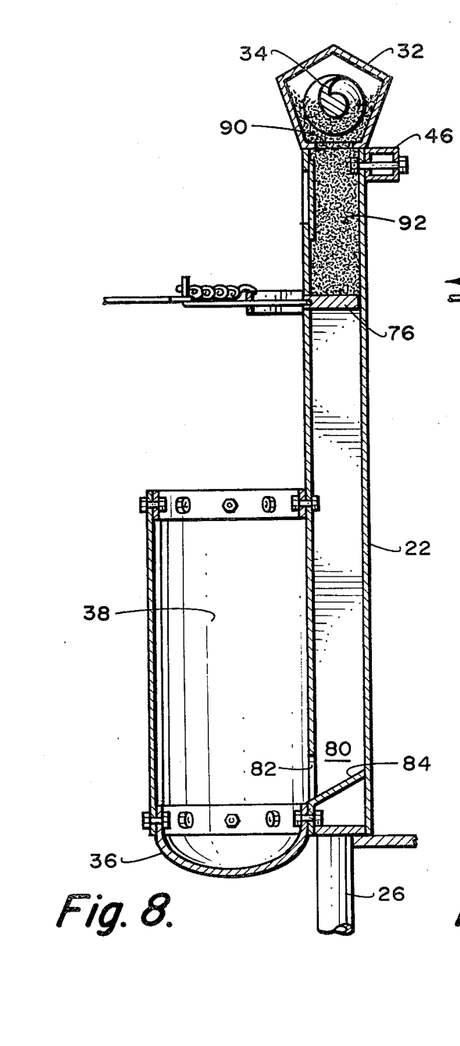
FIG. 8 is a schematic illustration showing a portion of the modular unit making up the improved milking parlor construction and illustrating the feed chute capability thereof.
Figure 9:
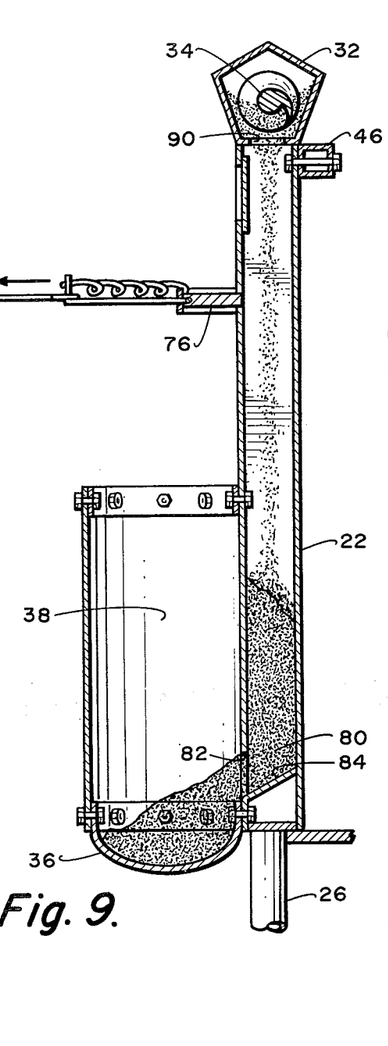
FIG. 9 is a view similar to FIG. 8 but illustrating the hollow upright member acting as the feed passageway.

Referring to FIGS. 8 and 9 the feeding mechanism as shown is FIGS. 2 and 3 may be more clearly discerned. As has been previously described, a feed chute 32 is superpositioned over the hollow vertical upright member 22 and the feed chute 32 runs the length of the milking parlor construction (only part of which is shown in FIG. 1 for purposes of clarity, it being understood that the chute extends the entire length of the milking parlor, and more specifically adjacent the milk stands 8 on either side of the pit 7). Feed is fed into the conveyor from a feed source, not shown and by reason of the individual openings 90 at each of the verticals 22, feed is fed by the auger to the vertical hollow members 22 and fills up the chamber 92 form by the closed feed chute 76. Upon pulling the handle 78 the chute member 76 is withdrawn to thereby allow that amount of feed retained in chamber 92 to fall and be fed into feed bowl 36. Alternately, the feed chute 76 may be maintained in the open position (FIG. 9) and feed allowed to continue to be fed into the feed bowl 36.

Figure 10:
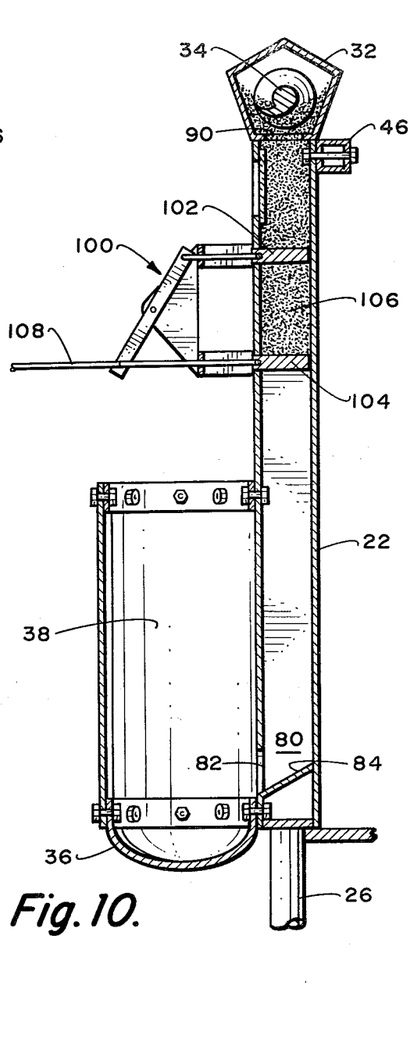
FIG. 10 is a view similar to FIGS. 8 and 9 but illustrating an alternative feeding mechanism that is capable of feeding metered amounts of feed to the hollow vertical upright member.

In an alternate embodiment of feeding, there is shown in FIG. 10 a dual chute mechanism 100 in this particular instance having an upper chute member 102 and a lower chute member 104. Fodder falls within the chamber 106 and by actuation of the actuating line 108 a metered, and only that metered amount, of fodder contained within the chamber 106 may be fed down the hollow upright 22 to the feed bowl 36. This concept may be utilized where it is desired to closely monitor the amount of feed or supplement to be delivered to the feed bowl 36. Reverse actuation of the mechanism 100 will again deliver a metered amount of fodder or supplement to the chamber 106, and only that amount, since the movement of the one chute 104 to the open position will open the chute 102 to the closed position, and vice versa, thereby insuring that only a metered amount of material will be contained within chamber 106 and fed therefrom.

Figure 11:
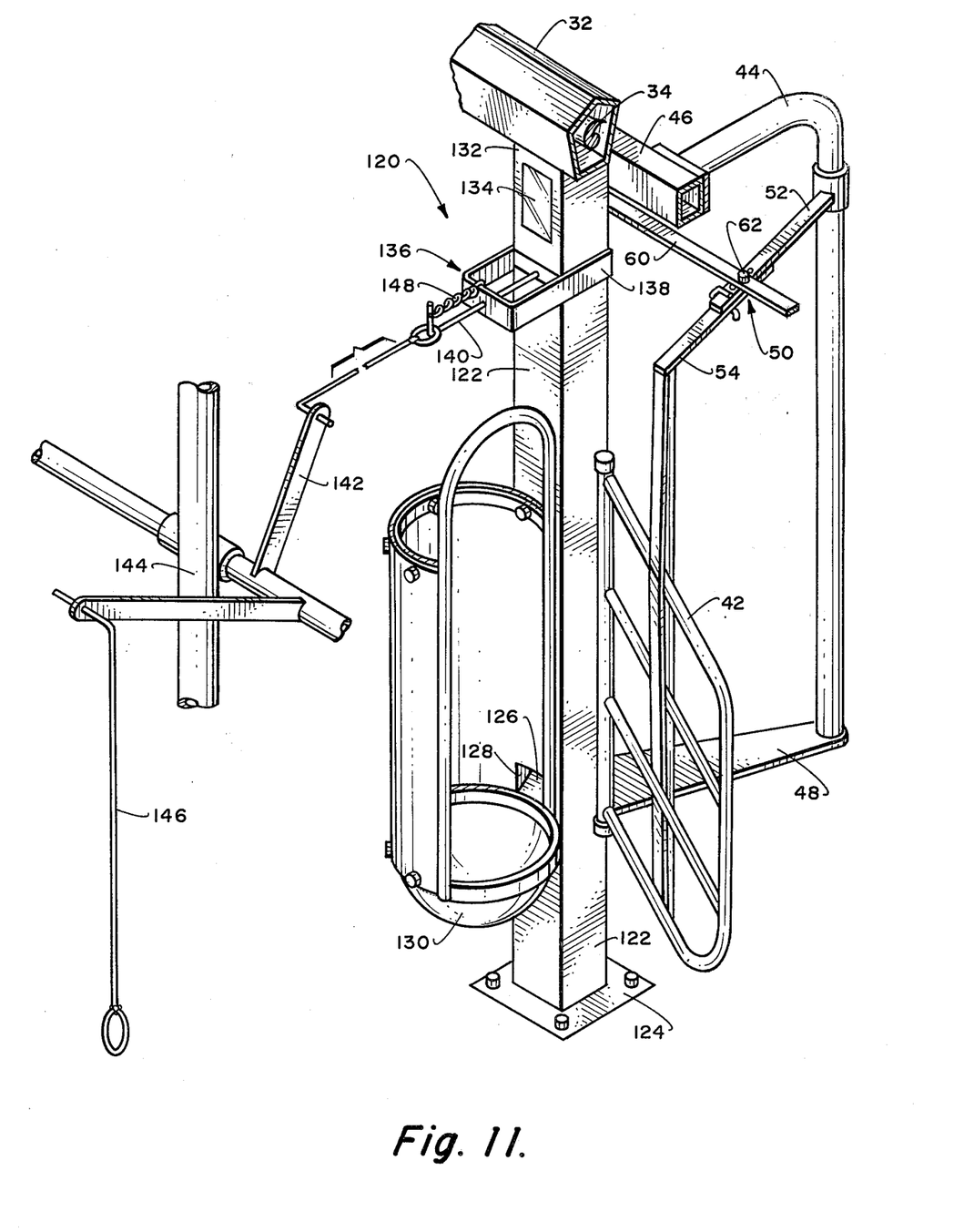
FIG. 11 is a perspective view illustrating the basic modular unit making up the improved milking parlor construction of the invention.

Referring now to FIG. 11, there is illustrated a basic modular unit 120 having the essential components as previously described but illustrating more detail of construction from an aesthetic standpoint than shown in the previous drawings or covered in the foregoing commentary. Additionally, in this particular instance, the vertical hollow upright member 122 terminates in a baseplate 124 which may be bolted or otherwise secured to a floor as was the support pipe 26 supporting the hollow vertical upright member 22. In the embodiment shown in FIG. 11, the hollow vertical upright 122 has the baffle 126 with feed aperture 128 opening into the feed bowl 130 in the same manner as has been previously described.

It will also be noted that the upper end 132 of the hollow vertical member 122 is provided with a plexiglass window 134 by which it may be determined if feed is being fed, in a visual manner.

It will also be noted that the feed chute mechanism 136 has side support brackets 138 supporting pull rod 140 which in turn is connected to lever member 142 supported form vertical upright 144 and which terminates in pull handle 146 in order to actuate the feed chute member, not shown, to open same so as to allow feed to flow from the feed conveyor down to the feed bowl 130. It will be noted that spring member 148 insures that the feed chute, not shown, is always in the normally closed position.

Figure 12:
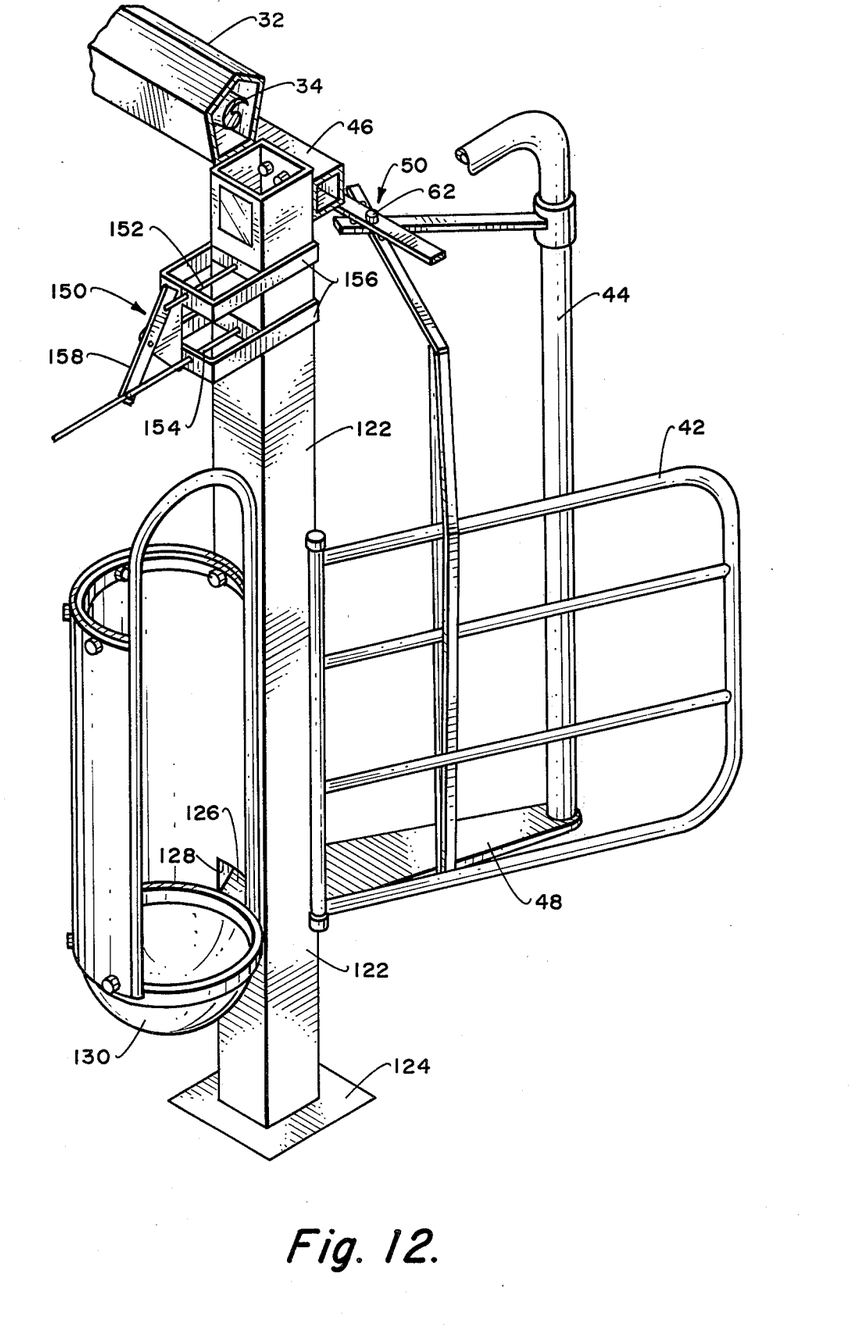
FIG. 12 is a perspective view similar to FIG. 11 but illustrating the alternative feeding mechanism for metered amounts of fodder.
Figure 13:
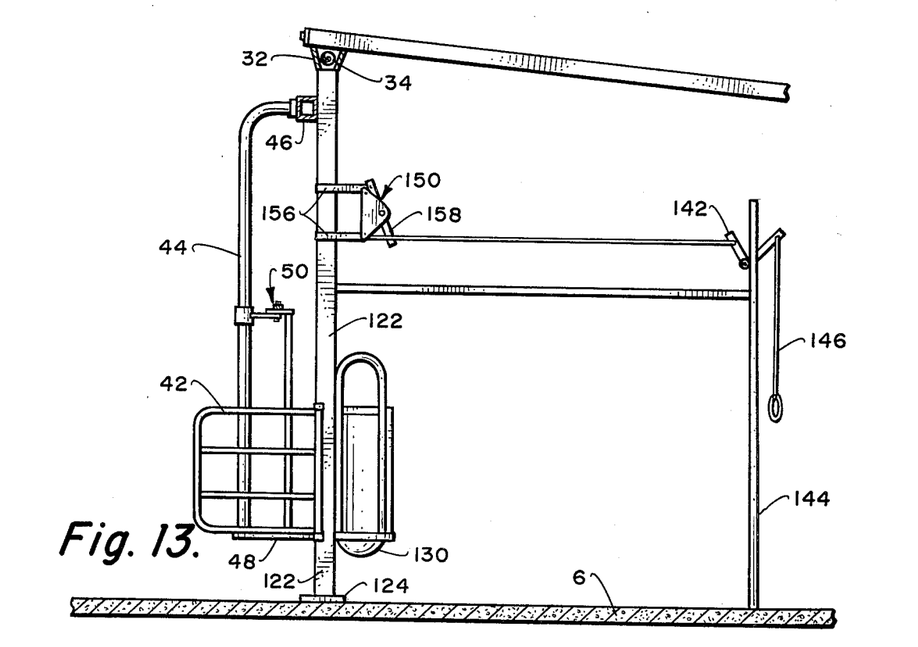
FIG. 13 is a side elevational view illustrating the alternative feeder mechanism and surrounding structure similar to that shown in FIG. 12.

Referring now to FIGS. 12 and 13, it will be noted that in this particular instance the vertical upright member 122 is as previously described, with all aspects being as described, essentially with the sole difference being the dual feed chute mechanism heretofore alluded to and described with other embodiments of the modular unit making up the improved milking parlor construction of the invention. In this instance, a dual feed chute mechanism is employed wherein the upper chute, not shown, is connected to mechanism 150 through first rod 152 while the lower chute, not shown, is connected to rod 154 and the assemblage maintained in rigid relationship to the hollow vertical upright 122 by means of support brackets 156. Movement of the lever 158 which is mounted for pivotal movement by means of the support structure, allows for the metered amount of fodder or other supplement to be fed down the hollow member 122 to the terminating feed bowl.

While the individual actuation mechanism for the feeding chutes as previously described in the various figures and drawings, have been shown as being manually and individually operated, those of ordinary skill in the art will at once recognize that suitable automatic and pneumatic actuators may be utilized in order to achieve the ends of the invention.

For example, while manual mechanisms have been illustrated with respect to the feed chutes, electrical systems driven by timed electric motors may be utilized in order to provide automatic timed feeding. Those of ordinary skill will at once recongnize the conventional means necessary to achieve this desired function.

Thus, there has been disclosed an improved milking parlor construction having, as a basic building block, a module of a unique and specific design and while specific construction and design materials have been alluded to, same have been used for purposes of description only and are not to be taken as delimiting of the invention. Indeed, those of ordinary skill in the art will at once recognize various changes and modifications that may be made to the disclosed invention, and all such changes and modifications will not depart from the spirit and essence of the invention and all are intended to be covered by the appended claims.

We claim:

1. Milking parlor construction comprising the combination: a module comprising a hollow vertical upright member adapted for rigid securement in a base or the like; a feed bowl means secured to said hollow vertical upright member and defining a cattle feeding station; a gate member pivotally mounted on said hollow vertical upright member and being adapted to move between an open position and a closed position; a feed conveyor means superpositioned in stationary position to said hollow vertical upright member and adapted to deliver feed to said hollow vertical upright member defining a feed passageway having communication to said feel bowl means; and means to move said gate member into a selected one of the open and closed positions.

2. The milking parlor construction in accordance with claim 1 included a plurality of the modules defined in claim 1 and each being in spaced and alinged relationship to define individual cattle receiving stations.

3. The milking parlor construction in accordance with claim 2 wherein said plurality of modules are laid out in a generally rectangular configuration having an intermediate milking pit with a cattle stand on either side thereof.

4. The milking parlor construction in accordance with claim 2 including a concrete floor in which the vertical members are secured and including remotely positioned means to open one or a selected plurality of said gates.

5. The milking parlor construction in accordance with claim 4 including horizontal tie-in structure for support of the plurality of modules.

6. The milking parlor construction in accordance with claim 5 including sidewalls and structures to shelter said plurality of modules, and including an entrance gate to each of said cattle stands.

7. The milking parlor construction in accordance with claim 6 including a steel plate for supporting said hollow vertical upright members.

8. The milking parlor construction in accordance with claim 7 wherein the support mechanism for said pivotally mounted gate member is of scissor-like configuration.

9. The milking parlor construction in accordance with claim 7 including a feed mechanism of auger configuration within said feed conveyor.

10. The milking parlor construction in accordance with claim 9 wherein said gate members are pneumatically controlled.

11. The milking parlor construction in accordance with claim 10 wherein a window means is provided in said hollow member to ascertain proper feeding therethrough.

12. The milking parlor construction in accordance with claim 11 including a feed plate member within said hollow vertical upright member defining a chamber for receiving a metered amount of feed therein.

13. The milking parlor construction in accordance with claim 11, including sloping floor and splash sheilds defining side walls of said milking stands.

14. The milking parlor construction in accordance with claim 13, including linear and vertical tie members to rigidity support said construction in a secure manner.

15. A milking station comprising a hollow vertical upright member adapted for rigid securement in a supporting base and having a communication to a source of fodder, or the like, and having a stationary fodder conveyor of steel plate construction with an exit port in a lower portion thereof for communicating feed to said hollow vertical upright member to a feed bowl secured at said exit port; said feed bowl having a U-shaped pipe structure defining an open sided feed station in cooperation with a curvilinear side wall member, supported from said feed bowl; a gate member pivotally secured to said vertical upright member and being moveable into an open or closed position and being supported to an overhead horizontal member comprising support structure so as to rigidly secure said module for securement with like modules; said pivotally mounted gate member having intersecting cross bar actuator means by which said gate is moved in a pivotal manner.

* * * * *